US012750692B2

(12) United States Patent
Iwakuni et al.

(10) Patent No.: US 12,750,692 B2
(45) Date of Patent: Sep. 29, 2026

(54) BEAM SETTING METHOD, BEAM SETTING APPARATUS AND PROGRAM

(71) Applicant: NTT, Inc., Tokyo (JP)

(72) Inventors: Tatsuhiko Iwakuni, Musashino (JP); Daisei Uchida, Musashino (JP); Takuto Arai, Musashino (JP); Shuki Wai, Musashino (JP); Naoki Kita, Musashino (JP); Takeshi Onizawa, Musashino (JP)

(73) Assignee: NTT, Inc., Tokyo (JP)

( * ) Notice: Subject to any disclaimer, the term of this patent is extended or adjusted under 35 U.S.C. 154(b) by 300 days.

(21) Appl. No.: 18/292,256

(22) PCT Filed: Aug. 5, 2021

(86) PCT No.: PCT/JP2021/029164
§ 371 (c)(1),
(2) Date: Jan. 25, 2024

(87) PCT Pub. No.: WO2023/012980
PCT Pub. Date: Feb. 9, 2023

(65) Prior Publication Data
US 2024/0349072 A1 Oct. 17, 2024

(51) Int. Cl.
*H04W 16/22* (2009.01)
*H04W 16/28* (2009.01)

(52) U.S. Cl.
CPC ........... *H04W 16/28* (2013.01); *H04W 16/22* (2013.01)

(58) Field of Classification Search
CPC ... H04W 16/28; H04W 16/22; H04B 7/06952
(Continued)

(56) References Cited

U.S. PATENT DOCUMENTS 9,253,592 B1 * 2/2016 Moscovich ............. H04W 4/80
2020/0313740 A1 10/2020 Wee et al.
(Continued)

FOREIGN PATENT DOCUMENTS

EP 3562053 A1 10/2019
JP 2016-504804 A 2/2016
(Continued)

OTHER PUBLICATIONS

IP.com search history (Year: 2026).*
(Continued)

*Primary Examiner* — Moustapha Diaby

(57) ABSTRACT

A beam setting method includes a communication method prediction step of predicting a communication method performed on the basis of whether there is a line-of-sight between a first radio station device and a second radio station device; a first beam number setting step of setting the number of beams transmitted by a beam sweep, in which signals using formable beams are sequentially transmitted in a time-division manner, to a first constant, when the communication method prediction step predicts that communication is performed by the communication method using reflected waves; and a second beam number setting step of setting the number of beams transmitted by the beam sweep to a second constant smaller than the first constant, when the communication method prediction step predicts that communication is performed by the communication method using line-of-sight waves.

7 Claims, 4 Drawing Sheets

(58) Field of Classification Search
USPC .......................................................... 455/446
See application file for complete search history.

(56) References Cited

U.S. PATENT DOCUMENTS

| | | | | |
|---|---|---|---|---|
| 2021/0006986 | A1* | 1/2021 | Zhu ........................ | H04B 7/088 |
| 2021/0135728 | A1* | 5/2021 | Raghavan ............ | H04B 17/336 |
| 2021/0318407 | A1 | 10/2021 | Ohara et al. | |

FOREIGN PATENT DOCUMENTS

| | | | |
|---|---|---|---|
| JP | 2019-004453 | A | 1/2019 |
| WO | WO-2014/074894 | A1 | 5/2014 |
| WO | WO-2019/038624 | A1 | 2/2019 |
| WO | WO-2020/031280 | A1 | 2/2020 |

OTHER PUBLICATIONS

Koji Takinami et al., "Standardization Trend and Elemental Technology for Millimeter Wave Band Radio LAN System", IEICE Communication Society Magazine, No. 38, Autumn 2016, pp. 100 to 106.

IEEE, "Part 11: Wireless LAN Medium Access Control (MAC) and Physical Layer (PHY) Specifications Amendment 3: Enhancements for Very High Throughput in the 60 GHz Band", IEEE Std 802.11ad-2012, Dec. 28, 2012.

Takayuki Nishio et al., "Proactive Traffic Control Based on Human Blockage Prediction Using RGBD Cameras for Millimeter-wave Communications", 2015 12th Annual IEEE Consumer Communications and Networking Conference (CCNC), 2015, pp. 152-153.

* cited by examiner

BEAM SETTING METHOD, BEAM SETTING APPARATUS AND PROGRAM

CROSS-REFERENCE TO RELATED APPLICATIONS

This application is a 371 U.S. National Phase of International Application No. PCT/JP2021/029164, filed on Aug. 5, 2021. The entire disclosure of the above application is incorporated herein by reference.

TECHNICAL FIELD

The present invention relates to a beam setting method, a beam setting device (a beam setting apparatus) and a program.

BACKGROUND ART

As radio communication using millimeter waves and quasi-millimeter waves divided into high frequency bands, there are 3rd Generation Partnership Project (3GPP), 5th Generation (5G), New Radio (NR), IEEE 802.11ad and the like. These radio communication schemes have advantages that a wide band can be secured as compared with the conventional microwave band, and that the linearity is large and interference with other communication is small. For this reason, they have been being put into practical use as means for realizing a large capacity radio (e.g., NPL 1).

A distance attenuation amount of a radio propagation path increases according to the frequency. Therefore, in communication in the millimeter wave band, it is common in a radio station device to form a directional beam (beamforming) and transmit a signal toward the radio station device serving as a communication partner. Similarly, it is common to form a directional beam and receive a signal in the radio station device.

The radio station device selects a beam that maximizes the reception power of the radio station device positioned opposite from among the directional beams that can be formed. The beam selection is performed by a procedure called sector level sweep (SLS), for example, in IEEE802.11ad (e.g., see NPL 2).

FIG. 4 is a conceptual diagram of a communication system 9 that selects a beam. The communication system 9 includes a first radio station device 91 and a second radio station device 92. The first radio station device 91 is a side (initiator) that transmits communication, and the second radio station device 92 is a side (responder) that receives communication from the first radio station device 91. The first radio station device 91 sequentially transmits signals using formable beams in time division. The sequential transmission of signals performed by the initiator is called a beam sweep. A beam which can be formed by the first radio station device 91 is previously linked to an ID, and shared with the second radio station device 92. The second radio station device 92 receives the signal transmitted from the first radio station device 91 by a beam having the maximum beam width, and measures the reception power thereof. Thereafter, the first radio station device 91 and the second radio station device 92 share the ID of the beam whose reception power becomes maximum, and the first radio station device 91 selects the beam corresponding to the shared ID.

Similarly, even in the 5G NR, a plurality of signal blocks called a synchronization signal/physical broadcast channel (SS/PBCH) are sequentially transmitted in a time-division manner for each beam of the radio base station device, and a beam having the largest reception power of the radio station device positioned opposite is selected.

The second radio station device 92 may perform beam sweep to the first radio station device 91 to select a beam.

CITATION LIST

Patent Literature

[NPL 1] Takinami and three others "Standardization Trend and Elemental Technology for Millimeter Wave Band Radio LAN System," IEICE Communication Society Magazine, No. 38, Autumn 2016, p. 100 to 106.

[NPL 2] IEEE, "Part 11: Radio LAN Medium Access Control (MAC) and Physical Layer (PHY) Specifications, Amendment 3: Enhancement for Very High Throughput in the 60 GHz Band" (IEEE Std 802.11ad-2012), 2012 Dec. 28

[NPL 3] T. Nishio, R. Arai, K. Yamamoto and M. Morikura, "Proactive traffic control based on human block prediction RGBD cameras for millimeter-wave communications," 2015 12th Annual IEEE Consumer Communication and Network Conference (CCNC), 2015, PP. 152-153, doi: 10.1109/CCNC.2015.7157963.

SUMMARY OF INVENTION

Technical Problem

However, as the frequency of communication increases, the number of antenna elements provided in the radio station device increases, and a width of the directional beam decreases. In the beam selecting method using the SLS, the SS/PBCH, etc., because the beam is selected by time division and round-robin, the processing time may increase.

An object of the present invention is to reduce the processing time when selecting a beam.

Solution to Problem

An aspect of the present invention is a beam setting method including: a communication method prediction step of predicting a communication method to be performed on the basis of whether there is a line-of-sight between a first radio station device and a second radio station device; a first beam number setting step of setting the number of beams transmitted by a beam sweep, in which signals using formable beams are sequentially transmitted in a time-division manner, to a first constant when it is predicted in the communication method prediction step that communication is performed by the communication method using reflected waves; and a second beam number setting step of setting the number of beams transmitted by the beam sweep to a second constant smaller than the first constant when it is predicted in the communication method prediction step that communication is performed by the communication method using line-of-sight waves.

An aspect of the present invention is a beam setting device including: a communication method prediction unit which predicts a communication method performed on the basis of whether there is a line-of-sight between a first radio station device and a second radio station device; a first beam number setting unit which sets the number of beams transmitted by a beam sweep, in which signals using formable beams are sequentially transmitted in a time-division manner, to a first constant when the communication method prediction unit predicts that communication is performed by the communication method using reflected waves; and a second beam number setting unit which sets the number of beams transmitted by the beam sweep to a second constant smaller than the first constant when the communication method prediction unit predicts that communication is performed by the communication method using line-of-sight waves.

An aspect of the present invention is a program which causes a computer to execute the above-described beam setting method.

Advantageous Effects of Invention

The number of beams can be set to support both communication using line-of-sight waves and communication using reflected waves.

DESCRIPTION OF EMBODIMENTS

Figure 1:
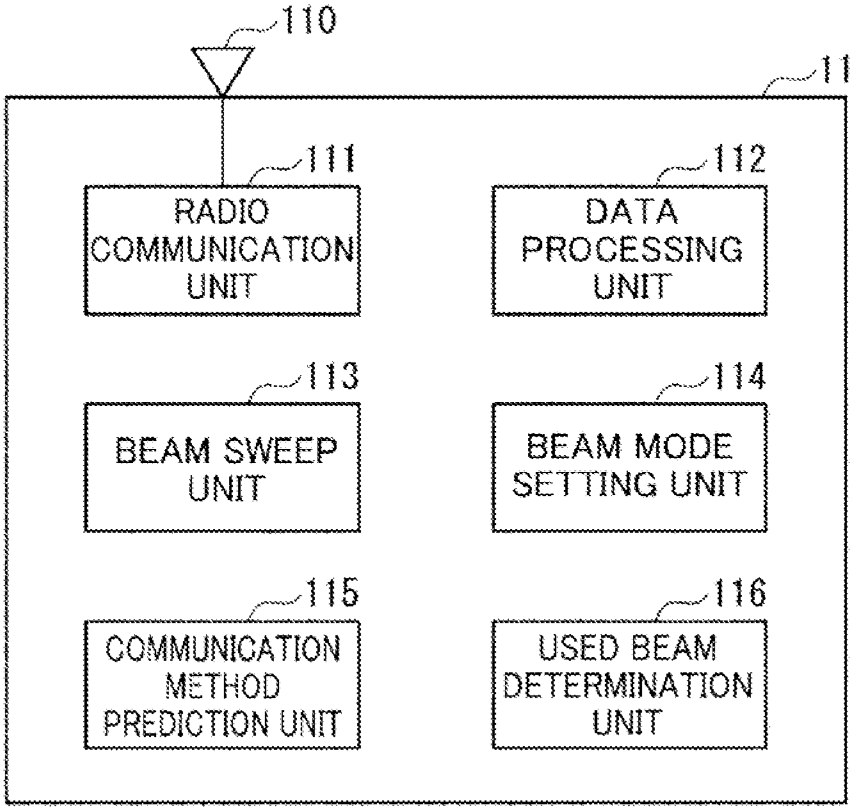
FIG. 1 is a diagram showing a configuration example of a first radio station device 11.

FIG. 1 is a diagram showing a configuration example of a first radio station device 11. The first radio station device 11 includes an antenna 110, a radio communication unit 111, a data processing unit 112, a beam sweep unit 113, a beam mode setting unit 114, a communication method prediction unit 115, and a used beam determination unit 116. The radio communication unit 111 transmits the data that is input from the data processing unit 112 by the antenna 110. The radio communication unit 111 also outputs data received by the antenna 110 to the data processing unit 112.

The data processing unit 112 outputs data that is input from a higher network or its interface (not shown) to the radio communication unit 111. The data processing unit 112 also outputs data that is input from the radio communication unit 111 to the higher network or its interface.

The beam sweep unit 113 controls the radio communication unit 111 to periodically perform the beam sweep. The beam mode setting unit 114 sets the number of beams in the beam sweep performed by the beam sweep unit 113 on the basis of the prediction result from the communication method prediction unit 115.

Figure 2A:
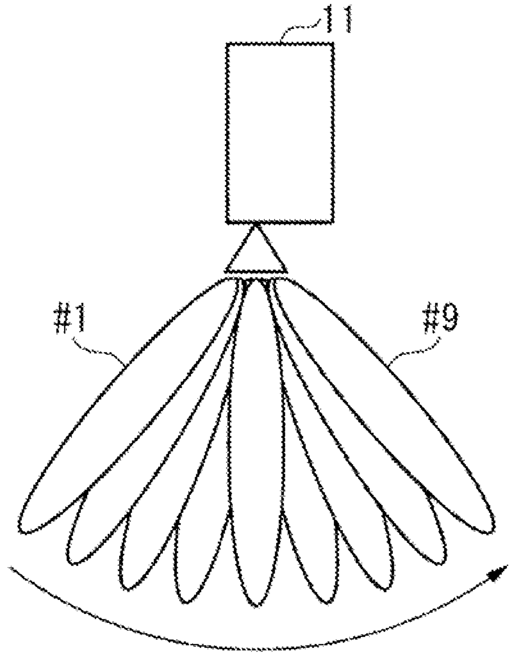
FIG. 2A is a diagram showing a beam transmitted by the first radio station device 11.
Figure 2B:
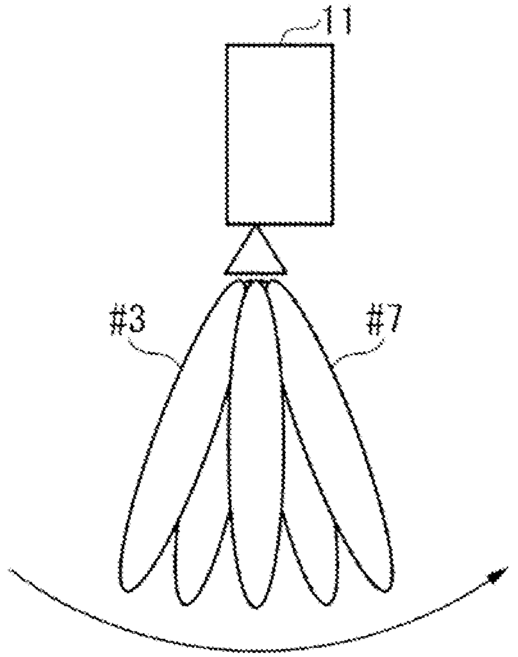
FIG. 2B is a diagram showing a beam transmitted by the first radio station device 11.

The number of beams when the radio communication unit 111 sweeps the beam is set, for example, as a first constant or a second constant. The first constant and the second constant are positive integer values, and the first constant is larger than the second constant. FIGS. 2A and 2B are diagrams showing beams transmitted by the first radio station device 11. The number of beams that are beam-swept by the first radio station device 11 shown in FIG. 2A is the first constant, for example, nine. The first constant may be the number of all beams that can be obtained by the radio communication unit. The number of beams that are beam-swept by the first radio station device 11 shown in FIG. 2B is the second constant, for example, five. A beam sweep having the number of beams as the first constant is called a first sweep mode, and a beam sweep having the number of beams as the second constant is called a second sweep mode.

In the first sweep mode and the second sweep mode, which beam is swept among beams that the first radio station device 11 can sweep may be changed depending on the position of the second radio station device 12 positioned opposite and the surrounding propagation environment. In FIGS. 2A and 2B, although the number of beams in the first sweep mode is 9, and the number of beams in the second sweep mode is 5, the number of beams is not limited thereto.

The beam sweep is performed with nine beams from beams #1 to #9 in the first sweep mode shown in FIG. 2A, whereas the beam sweep is performed with five beams from beams #3 to #7 in the second sweep mode shown in FIG. 2B. In a high-frequency band, the straight advance of radio waves is high, and there is a high possibility of communication using line-of-sight waves. That is, when the beam selected at a certain point of time is #5, the beams to be selected next are highly likely to be the beams #4 and #6 in the vicinity thereof, and the possibility of the beams #1 and #9 being selected is low. Therefore, the beams #1 and #9 are often appropriately selected without performing the beam sweep. Therefore, in the case of communication using line-of-sight waves, the number of beams swept in the second sweep mode is smaller than that in the first sweep mode, and an appropriate beam can be selected with reduced processing time.

On the other hand, the first sweep mode is effective when the first radio station device 11 performs communication by utilizing the reflected wave. For example, in the case where a shielding object exists between the first radio station device 11 and the second radio station device 12, it is considered that the first radio station device 11 uses the beam #1 or 9 to reflect the beam #1 or 9 to a reflector and communicate with the second radio station device 12.

The communication method prediction unit 115 predicts which communication method is used between a communication method using the reflected wave and a communication method using the line-of-sight wave. The communication method prediction unit 115 predicts a method of communication to be performed on the basis of, for example, a line-of-sight of a surrounding environment. The communication method prediction unit 115 predicts a communication method to be performed on the basis of line-of-sight of communication between the first radio station device 11 and a second radio station device 12 which is a communication partner. The communication method prediction unit 115 predicts that communication to be performed is communication by a communication method using a reflected wave when a shielding object is detected, for example, using an RGB-D camera (for a detection method of a shielding object, refer to NPL 3 or the like). The communication method prediction unit 115 predicts that communication to be performed is communication by a communication method using line-of-sight waves, for example, when a direction difference between the beam selected by the beam sweep unit 113 and the beam selected before selecting the beam is equal to or less than a fixed value.

The used beam determination unit 116 determines a beam to be used for communication. The used beam determination unit 116 determines a beam to be used for communication on the basis of the data transmitted by the second radio station device 12. The data transmitted by the second radio station device 12 is, for example, data of the reception intensity of each beam when the first radio station device 11 sweeps the beam. At this time, the used beam determination unit 116 determines a beam having the largest reception intensity as a beam to be used for communication. The data transmitted by the second radio station device 12 may be an ID corresponding to a beam having the largest reception intensity among the respective beams when the first radio station device 11 sweeps the beam. At this time, the used beam determination unit 116 determines a beam corresponding to the ID as a beam to be used for communication.

Figure 3:
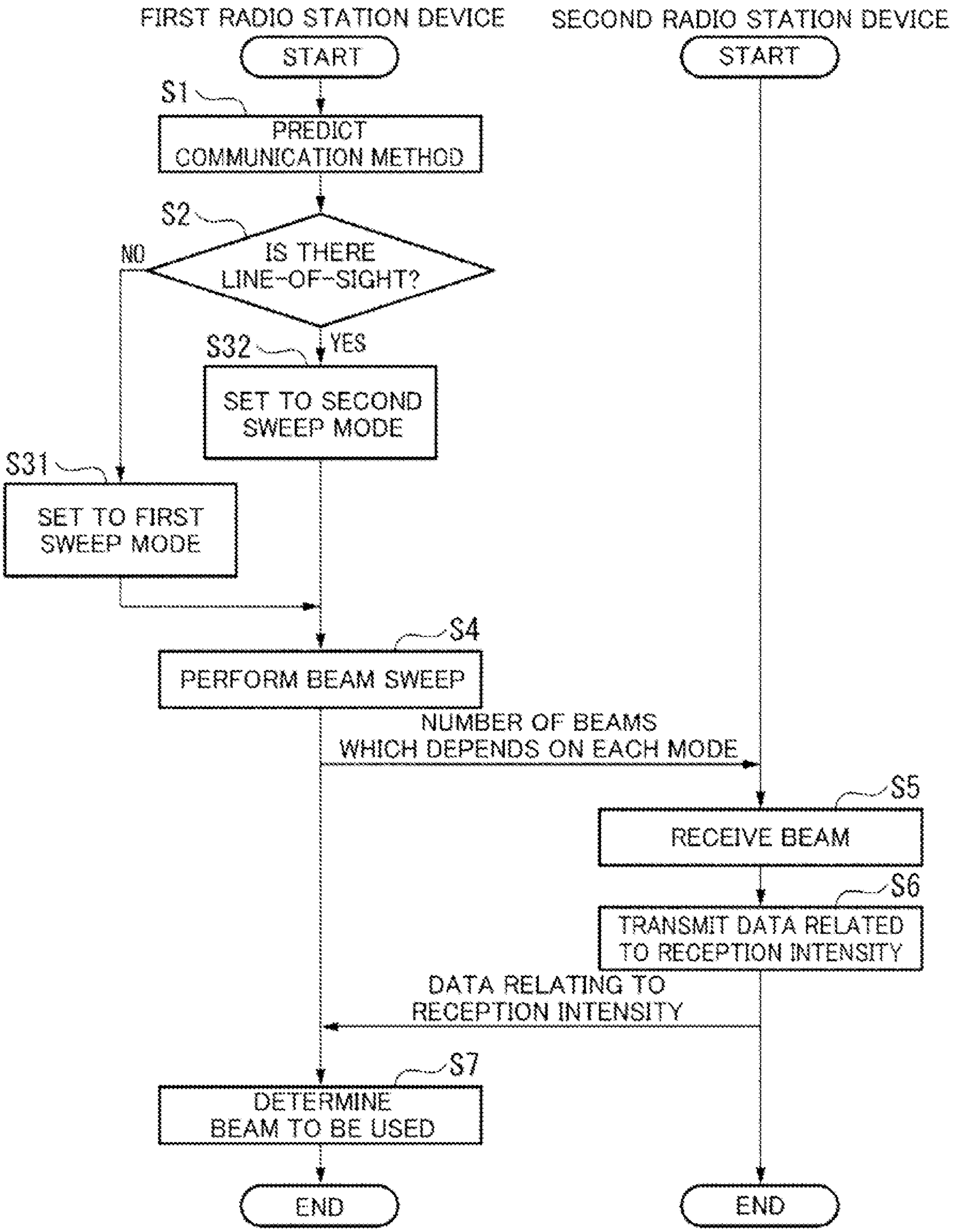
FIG. 3 is a flowchart showing a method of beam sweeping performed by the first radio station device 11.
Figure 4:
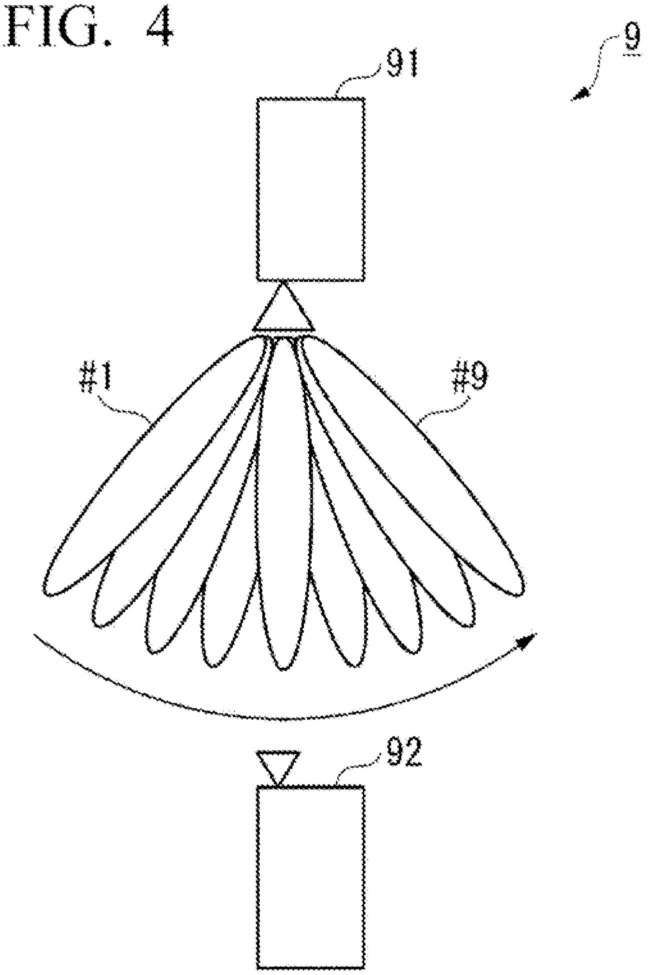
FIG. 4 is a schematic diagram of a communication system 9 that selects the beam.

FIG. 3 is a flowchart showing a beam sweep method performed by the first radio station device 11. First, the communication method prediction unit 115 predicts a communication method to be performed (step S1). When there is no line-of-sight (step S2: No), the beam mode setting unit 114 sets a sweep mode to the first sweep mode (step S31). When there is a line-of-sight (step S2: Yes), the beam mode setting unit 114 sets a sweep mode to the second sweep mode (step S32). If the communication method prediction unit 115 determines that there is no line-of-sight when the sweep mode has already been set to the first sweep mode, the beam mode setting unit 114 does not set the sweep mode to the first sweep mode and may maintain the existing setting. When the communication method prediction unit 115 determines that there is a line-of-sight when the sweep mode has already been set to the second sweep mode, the beam mode setting unit 114 does not set the sweep mode to the second sweep mode, and may maintain the existing setting.

Thereafter, the beam sweep unit 113 performs beam sweep according to the set sweep mode (step S4). The second radio station device 12 receives the beam transmitted from the first radio station device 11 (step S5), and transmits data related to reception intensity to the first radio station device 11 (step S6). Thereafter, the used beam determination unit 116 determines a beam to be used for communication on the basis of the data related to the reception intensity (step S7)

According to the above configuration, when the communication method to be performed is predicted to be communication using line-of-sight waves, since there is a high possibility of a beam in the vicinity of a beam being used being selected, the first radio station device 11 performs the beam sweep in the second sweep mode with a small number of beams, and reduces the processing time required for sweep. On the other hand, when the communication method to be performed is predicted to be communication using a reflected wave, since there is a possibility of a beam not included in a beam in the vicinity of a beam being used being selected, the beam sweep is performed in the first sweep mode having a large number of beams, and a beam appropriate for communication is more reliably found. As a result, both transmission efficiency and communication quality can be achieved.

Although embodiments of this invention have been described in detail above with reference to the drawings, specific configurations are not limited to these embodiments, and encompass designs and the like that do not depart from the gist of the invention.

The sweep mode is not limited to two of the first sweep mode and the second sweep mode. For example, three or more sweep modes may be provided, and the number of beams corresponding to the sweep modes may be different for each other. At this time, when the communication method prediction unit 115 predicts that communication is performed by the communication method using line-of-sight waves, the beam mode setting unit 114 changes from a sweep mode under setting to a sweep mode of a beam number which is the next smaller than the beam number corresponding to the sweep mode under setting. When the communication method prediction unit 115 predicts that communication is performed by the communication method using a reflected wave, the beam mode setting unit 114 changes the sweep mode under setting to the sweep mode having the next larger number of beams than the number of beams corresponding to the sweep mode under setting. Thus, the number of beams to be swept can be increased or decreased stepwise.

Although the beam mode setting unit 114 sets the beam mode on the basis of the prediction by the communication method prediction unit 115 when performing the beam sweep, the present invention is not limited thereto. For example, when the communication method prediction unit 115 predicts that communication is performed by the communication method using line-of-sight waves a predetermined number of times or more by that time, the beam mode setting unit 114 may change the setting from the first sweep mode to the second sweep mode.

A part or all of the first radio station device 11 and the second radio station device 12 in the above-described embodiment may be implemented by a computer. In such a case, a program for realizing this function may be recorded in a computer-readable recording medium, and the program recorded in this recording medium may be read into a computer system, and may be realized by being executed. The "computer system" mentioned here includes an OS and hardware such as peripheral devices. Further, the "computer-readable recording medium" refers to portable media such as a flexible disc, a magneto-optical disc, a ROM, and a CD-ROM, and a storage device such as a hard disk built in a computer system. Furthermore, the "computer-readable recording medium" may also include a medium that dynamically holds a program for a short period of time, such as a communication line when transmitting the program via a network such as Internet or a communication line such as a telephone line, and a medium that holds the program for a certain period of time, such as a volatile memory inside a computer system serving as a server or a client in that case. Further, the program may be for realizing some of the functions described above, may be capable of realizing the functions described above in combination with a program already recorded in a computer system, or may be realized using a programmable logic device such as a field programmable gate array (FPGA).

REFERENCE SIGNS LIST

- 11, 91 First radio station device
- 12, 92 Second radio station device
- 110 Antenna
- 111 Radio communication unit
- 112 Data processing unit
- 113 Beam sweep unit
- 114 Beam mode setting unit
- 115 Communication method prediction unit
- 116 Used beam determination unit

The invention claimed is:

1. A beam setting method comprising:

predicting a communication method performed on the basis of whether there is a line-of-sight between a first radio station device and a second radio station device;

setting the number of beams transmitted by a beam sweep, in which signals using formable beams are sequentially transmitted in a time-division manner, to a first constant when it is predicted by predicting the communication method that communication is performed by the communication method using reflected waves; and setting the number of beams transmitted by the beam sweep to a second constant smaller than the first constant when it is predicted by predicting the communication method that communication is performed by the communication method using line-of-sight waves.

2. The beam setting method according to claim 1, further comprising:

setting the number of beams transmitted by the beam sweep to the first constant when it is predicted that communication is performed by the communication method using the reflected waves a predetermined number of times or more, and setting the number of beams transmitted by the beam sweep to the second constant when it is predicted that communication is performed by the communication method using line-of-sight waves a predetermined number of times or more.

3. A beam setting method comprising:

predicting a communication method performed on the basis of whether there is a line-of-sight between a first radio station device and a second radio station device;

setting the number of beams transmitted by a beam sweep, in which signals using formable beams are sequentially transmitted in a time-division manner, to a number larger than a set number when it is predicted by predicting the communication method that communication is performed by a communication method using reflected waves; and setting the number of beams transmitted by the beam sweep to a number smaller than the set number when it is predicted by predicting the communication method that communication is performed by the communication method using line-of-sight waves.

4. A beam setting device comprising:

a memory storing instructions;

at least one processor connected to the memory and executes the instructions to:

predict a communication method performed on the basis of whether there is a line-of-sight between a first radio station device and a second radio station device;

set the number of beams transmitted by a beam sweep, in which signals using formable beams are sequentially transmitted in a time-division manner, to a first constant when it is predicted by predicting the communication method that communication is performed by the communication method using reflected waves; and a second beam number setting unit which sets the number of beams transmitted by the beam sweep to a second constant smaller than the first constant when it is predicted by predicting the communication method that communication is performed by the communication method using line-of-sight waves.

5. The beam setting device according to claim 4, wherein the at least one processor further executes the instructions to:

set the number of beams transmitted by the beam sweep to the first constant when it is predicted that communication is performed by the communication method using the reflected waves a predetermined number of times or more, and set the number of beams transmitted by the beam sweep to the second constant when it is predicted that communication is performed by the communication method using line-of-sight waves a predetermined number of times or more.

6. A non-temporal storage medium storing a program which causes a computer to execute the beam setting method comprising:

predicting a communication method performed on the basis of whether there is a line-of-sight between a first radio station device and a second radio station device;

setting the number of beams transmitted by a beam sweep, in which signals using formable beams are sequentially transmitted in a time-division manner, to a first constant when it is predicted by predicting the communication method that communication is performed by the communication method using reflected waves; and setting the number of beams transmitted by the beam sweep to a second constant smaller than the first constant when it is predicted by predicting the communication method that communication is performed by the communication method using line-of-sight waves.

7. The non-temporal storage medium according to claim 6, wherein the program causes the computer to execute the beam setting method further comprising:

setting the number of beams transmitted by the beam sweep to the first constant when it is predicted that communication is performed by the communication method using the reflected waves a predetermined number of times or more, and setting the number of beams transmitted by the beam sweep to the second constant when it is predicted that communication is performed by the communication method using line-of-sight waves a predetermined number of times or more.

* * * * *